US008415612B2

(12) United States Patent
McBride et al.

(10) Patent No.: US 8,415,612 B2
(45) Date of Patent: Apr. 9, 2013

(54) CHANNEL CELL SYSTEM

(75) Inventors: Sterling Eduardo McBride, Princeton, NJ (US); Steven Alan Lipp, West Windsor, NJ (US); Joey John Michalchuk, Lambertville, NJ (US); Dana Z. Anderson, Boulder, CO (US); Evan Salim, Boulder, CO (US); Matthew Squires, Tewksbury, MA (US)

(73) Assignees: The Regents of the University of Colorado, Denver, CO (US); Sarnoff Corporation, Princeton, NJ (US)

( * ) Notice: Subject to any disclaimer, the term of this patent is extended or adjusted under 35 U.S.C. 154(b) by 0 days.

(21) Appl. No.: 12/600,825

(22) PCT Filed: May 19, 2008

(86) PCT No.: PCT/US2008/064149

§ 371 (c)(1),
(2), (4) Date: Apr. 20, 2010

(87) PCT Pub. No.: WO2009/023338

PCT Pub. Date: Feb. 19, 2009

(65) Prior Publication Data

US 2010/0207016 A1 Aug. 19, 2010

Related U.S. Application Data

(60) Provisional application No. 60/945,477, filed on Jun. 21, 2007, provisional application No. 60/945,479, filed on Jun. 21, 2007, provisional application No. 60/938,993, filed on May 18, 2007, provisional application No. 60/938,990, filed on May 18, 2007.

(51) Int. Cl.
*H01S 1/00* (2006.01)
*H01S 3/00* (2006.01)
*H05H 3/02* (2006.01)

(52) U.S. Cl.
USPC ........ 250/251; 250/428; 250/430; 250/423 R; 250/432 R; 250/436

(58) Field of Classification Search .................. 250/251, 250/428, 430, 423 R, 432 R, 436
See application file for complete search history.

(56) References Cited

U.S. PATENT DOCUMENTS

| | | | | |
|---|---|---|---|---|
| 6,093,330 | A * | 7/2000 | Chong et al. | 216/2 |
| 6,303,928 | B1 * | 10/2001 | Buell et al. | 250/251 |
| 2005/0199871 | A1 * | 9/2005 | Anderson et al. | 257/14 |

OTHER PUBLICATIONS

International Application No. PCT/US2008/064149, International Search Report and Written Opinion, 11 pages, Mar. 4, 2009.
Du, Shengwang, "Atom-Chip Bose-Einstein Condensation in a Portable Vacuum Cell," Doctoral Thesis, University of Colorado, 182 pages, 2005.

(Continued)

*Primary Examiner* — Jack Berman
*Assistant Examiner* — Meenakshi Sahu
(74) *Attorney, Agent, or Firm* — Perkins Coie LLP

(57) ABSTRACT

A cold-atom system has multiple vacuum chambers. One vacuum chamber includes an atom source. A fluidic connection is provided between that vacuum chamber and another vacuum chamber. The fluidic connection includes a microchannel formed as a groove in a substantially flat surface and covered by a layer of material.

58 Claims, 15 Drawing Sheets

OTHER PUBLICATIONS

Gong, F. et al., "Electrolytic Fabrication of Atomic Clock Cells," Review of Scientific Instruments, vol. 77, pp. 076101-1-076101-3, 2006.

Greiner, Markus et al., "Collapse and Revival of the Matter Wave Field of a Bose-Einstein Condensate," arXiv:cond-mat/0207196v1 [cond-mat.soft], 14 pages, Jul. 8, 2002.

Liew, Li-Ann et al., "Microfabricated Alkali Atom Vapor Cells," Applied Physics Letters, vol. 84, No. 14, pp. 2694-2696, Apr. 5, 2004.

Öttl, Anton et al., "Hybrid Apparatus for Bose-Einstein Condensation and Cavity Quantum Electrodynamics: Single Atom Detection in Quantum Degenerate Gases," Rev. Sci. Instrum., 20 pages, Jul. 5, 2006.

Pereira Dos Santos, F. et al., "Efficient Magneto-Optical Trapping of a Metastable Helium Gas," arXiv:physics/0103064v1 [physics.atom-ph], 12 pages, Mar. 20, 2001.

Wang, Ying-Ju, "An On-Chip Atom Interferometer Using a Bose-Einstein Condensate," Doctoral Thesis, University of Colorado, 112 pages, 2005.

* cited by examiner

Fig. 7A
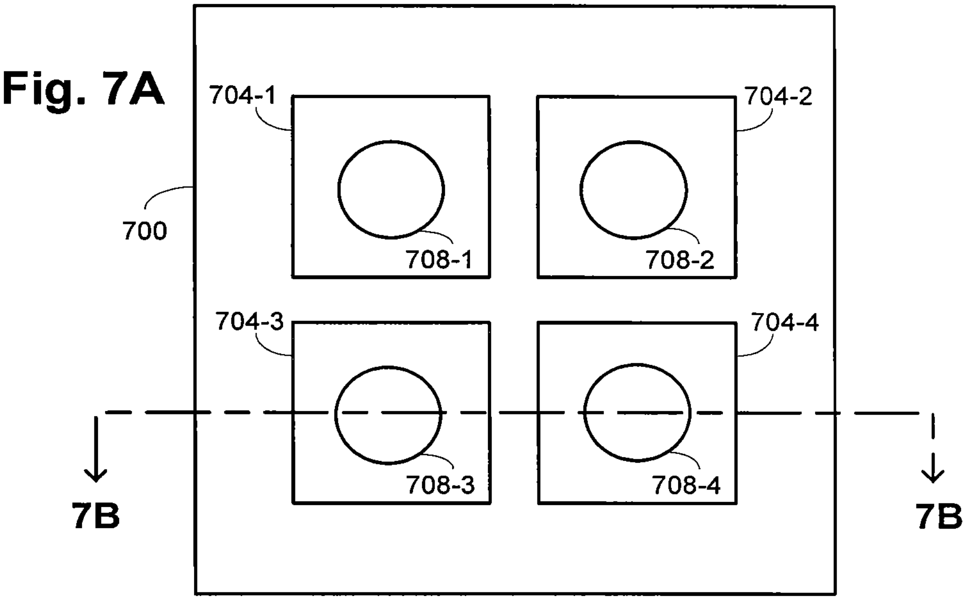
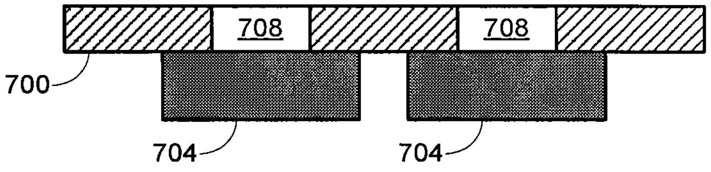
Fig. 7B
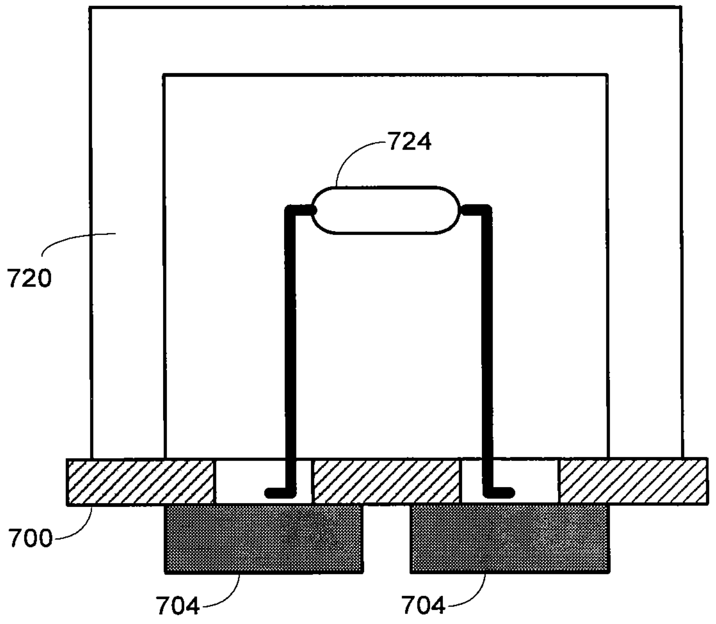
Fig. 7C

Fig. 8A
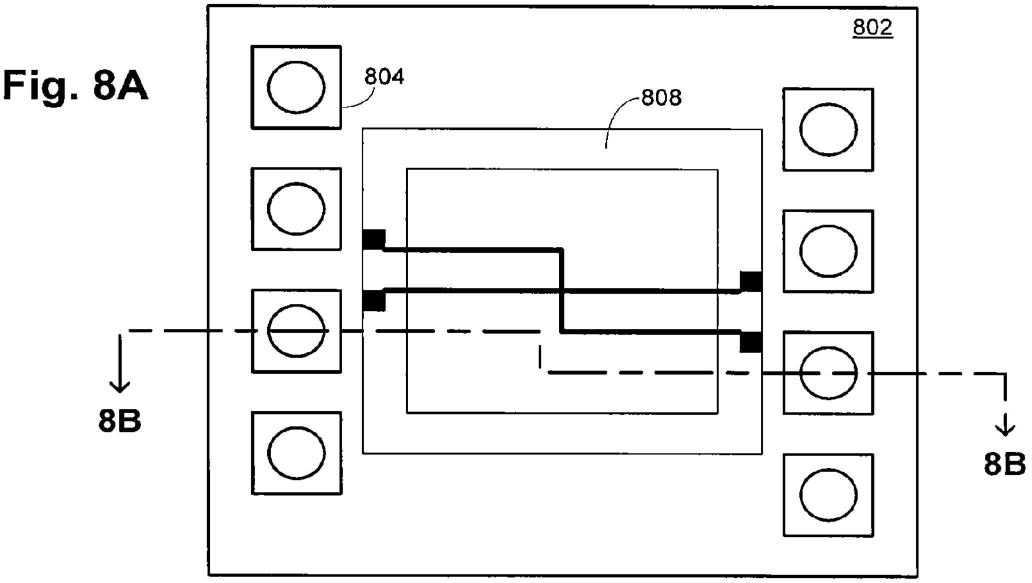
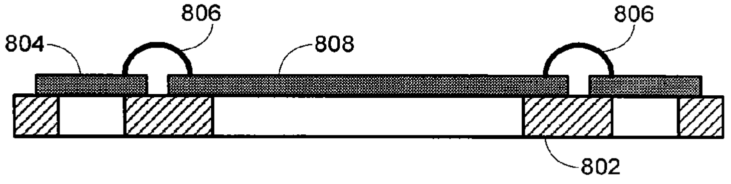
Fig. 8B

CHANNEL CELL SYSTEM

CROSS-REFERENCES TO RELATED APPLICATIONS

This application is a nonprovisional of each of the following U.S. provisional applications, the entire disclosure of each of which is incorporated herein by reference for all purposes: U.S. Prov. Appl. No. 60/938,990, entitled "Integrated Atom System: Part I," filed May 18, 2007; U.S. Prov. Appl. No. 60/938,993, entitled "Integrated System: Part II," filed May 18, 2007; U.S. Prov. Appl. No. 60/945,477, entitled "Integrated Atom System: Part II—Addendum," filed Jun. 21, 2007; and U.S. patent application Ser. No. 60/945,479, entitled "Integrated Atom System: Part II B," filed Jun. 21, 2007.

This application is related to the concurrently filed PCT application entitled "ULTRACOLD-MATTER SYSTEMS," naming Dana Z. Anderson, Evan Salim, Matthew Squires, Sterling Eduardo McBride, Steven Alan Lipp, and Joey John Michalchuk as inventors PCT/US2008/064150, the entire disclosure of which is incorporated herein by reference for all purposes.

STATEMENT AS TO RIGHTS TO INVENTIONS MADE UNDER FEDERALLY SPONSORED RESEARCH OR DEVELOPMENT

This invention was made with government support under Grant No. W911NF-04-1-0043 awarded by the U.S. Army Research Office. The government has certain rights in the invention.

BACKGROUND OF THE INVENTION

This application relates generally to Bose-Einstein condensates. More specifically, this application relates to a multichamber Bose-Einstein-condensate vacuum system.

Ultracold-matter science has been a blossoming field of atomic physics since the realization of a Bose-Einstein condensate in 1995. This scientific breakthrough has also opened the way for possible technical applications that include atom interferometry such as might be used for ultrasensitive sensors, time and frequency standards, and quantum information processing. One approach for developing technology involving ultracold matter, and particularly ultracold atoms, is the atom chip. Such chips are described in, for example, J. Reichel, "Microchip traps and Bose-Einstein condensation," Appl. Phys. B, 74, 469 (2002), the entire disclosure of which is incorporated herein by reference for all purposes. Such atom chips typically use currents in microfabricated wires to generate magnetic fields to trap and manipulate atoms. This chip approach allows for extremely tight confinement of the atoms and potential miniaturization of the apparatus, making the system compact and portable. But despite this, most atom-chip apparatus are of the same size scale as conventional ultracold atom systems, being of the order of one meter on one edge.

Current cold-atom and ion applications generally use an ultrahigh vacuum apparatus with optical access. The vacuum chamber of an atom chip typically provides an ultrahigh vacuum with a base pressure of less than $10^{-9}$ torr at the atom-chip surface. It also provides the atom chip with multi-line electrical connections between the vacuum side of the microchip and the outside. Optical access may be provided through windows for laser cooling, with a typical system having 1 $cm^2$ or more optical access available from several directions. A source of atoms or ions is also included.

Most conventional ultracold matter systems use multiple-chamber vacuum system: a high vapor-pressure region for the initial collection of cold atoms and an ultrahigh-vacuum region for evaporation and experiments. Chip-based systems have significantly relaxed vacuum requirements compared to their free-space counterparts, and many have used single vacuum chamber, modulating the pressure using light-induced atomic desorption. This approach may be problematic because it requires periodic reloading of the vacuum with the atom to be trapped, which in turn prevents continuous operation of the device. In addition, most ultracold matter vacuum systems use a series of pumps: typically a roughing pump, a turbo pump, one or more ion pumps, and one ore more titanium sublimation pumps. Such systems are large, costly, and poorly suited to applications for which small size, low weight, and low power consumption are emphasized.

There is accordingly a need in the art for improvements to systems for handling cold atoms.

BRIEF SUMMARY OF THE INVENTION

Embodiments of the invention provide a cold-atom system that comprises a plurality of vacuum chambers. A first of the vacuum chambers includes an atom source. A fluidic connection is provided between the first of the vacuum chambers and a second of the vacuum chambers. The fluidic connection comprises a microchannel formed as a groove in a substantially flat surface and covered by a layer of material.

In some embodiments the second of the vacuum chambers may include an atom chip. The microchannel may be formed within a single substrate. At least one of the vacuum chambers may include a gas getter and/or an ion pump. In some instances, a mechanism is provided to transport an atom through the microchannel from the first of the vacuum chambers to the second of the vacuum chambers. The mechanism could comprise a magnetic motor.

In certain instances, at least one of the vacuum chambers comprises a source of illumination, which might be an optical arrangement configured to generate a standing light field.

Other embodiments provide a method of handling cold atoms. A cold atom is produced from an atom source disposed within a first vacuum chamber. The cold atom is transported from the first vacuum chamber to a second vacuum chamber through a microchannel formed as a groove in a substantially flat surface and covered by a layer of material. Variations on such methods may be implemented in a manner similar to the variations described above in connection with the cold-atom system.

In further embodiments, a cold atom system comprises a frame and a plurality of components bonded with the frame with a vacuum-compatible bond and compatible with a temperature change greater than 100 K. At least one of the components includes a vacuum chamber having an atom source.

In one specific embodiment, the frame comprises silicon and at least some of the plurality of components comprise glass. The frame may sometimes have a thickness of at least 2 mm. At least some of the plurality of components may be anodically bonded with the frame. The frame might comprise a substantially flat substrate having a plurality of embedded cavities.

Additional embodiments of a cold-atom system in accordance with the invention may comprise a plurality of vacuum chambers, a first of the vacuum chambers including an atom source and a second of the vacuum chambers including an optical-quality window. A source of illumination is provided, as is an optical train disposed to propagate light from the source of illumination through the optical-quality window to illuminate the second of the vacuum chambers.

In certain embodiments, the second of the vacuum chambers comprises the first of the vacuum chambers. The optical train may be configured to generate a standing light field from the light within the second of the vacuum chambers. Merely by way of example, the optical train may comprise a laser and a lens or may comprise a fiber optic and a lens.

The invention also includes embodiments of an electrical feedthrough. The electrical feedthrough comprises a substrate having a throughhole and an element bonded to the substrate with a vacuum-compatible bond. The element includes an electrically conducting cover plate.

The cover plate itself may sometimes be bonded to the substrate. The vacuum-compatible bond may comprise an anodic bond. The vacuum-compatible bond may also additionally be compatible with a temperature change greater than 100 K. The substrate may comprise glass and/or the cover plate may comprise a nickel alloy. In some embodiments, the cover plate comprises a metal or metal alloy polished to a mirror finish. The electrical feedthrough may be bonded with a substantially planar substrate that is part of an ultrahigh vacuum chamber.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, reference labels include a numerical portion followed by a suffix; reference to only the base numerical portion of reference labels is intended to refer collectively to all reference labels that have that numerical portion but different suffices.

FIGS. 7A and 7B provide illustrations of an electrical feedthrough that may be used with the microchannel cold-atom systems of the invention;

FIG. 7C provides an illustration of a planar electrical feedthrough attached to a UHV chamber or cell in accordance with embodiments of the invention;

FIGS. 8A and 8B provide illustrations of a planar atom manipulator device that may be used with the microchannel cold-atom systems of the invention;

DETAILED DESCRIPTION OF THE INVENTION

Embodiments of the invention provide systems and methods for handling cold atoms that enables the realization of fully integrated miniaturized cold-atom systems such as atom interferometers. As used herein, references to "cold" atoms refer to atoms in an environment having a thermodynamic temperature between 100 μK and 1 mK, such as may be achieved through laser cooling. References to "ultracold" atoms refer to atoms in an environment in which the temperature is not amenable to a thermodynamic definition because the physical conditions result in a dominance of quantum-mechanical effects, as is understood by those of skill in the art.

These embodiments make use of multiple chambers that are interconnected by microchannel structures and apertures fabricated within a single substrate. Such an approach of integrating multiple functions into a single substrate with microchannel technology enables the realization of fully integrated miniaturized cold-atom systems such as atom interferometers.

Figure 1A:
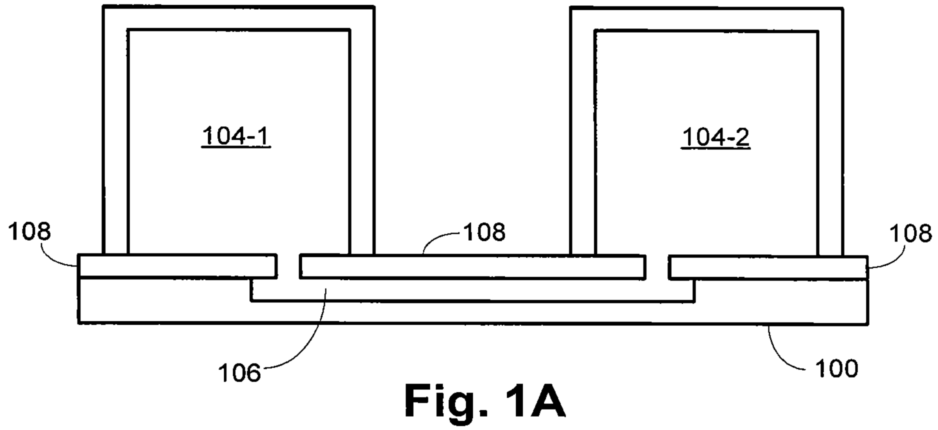
FIGS. 1A and 1B provide a schematic illustration of an embodiment of the invention in which two chambers are interconnected by a microchannel.
Figure 1B:
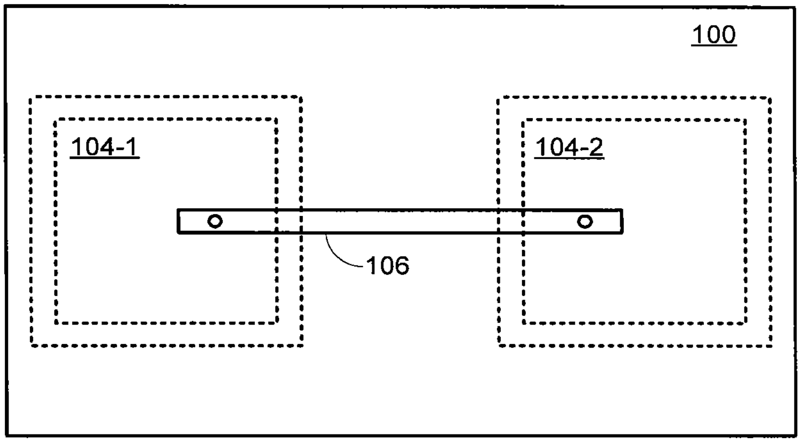

As used herein, "microchannel" structures are structures that have a groove cut into a flat surface that is covered by another layer, such as where a groove has been cut into a silicon surface that is covered by glass. Different ways in which this may be achieved are illustrated with FIGS. 1A-1C. FIGS. 1A and 1B respectively show side and top views of a cold-atom system that includes a plurality of chambers. In this particular embodiment, two chambers 104 are interconnected by a microchannel 106 that is fabricated within a substrate, but the invention is not limited to two chambers 104 and other embodiments are shown below in which a larger number of chambers 104 are used. The substrate may comprise a variety of different materials in different embodiments, with it including a layer of glass 108 anodically bonded to a layer of silicon 100 in one specific embodiment. The microchannel 106 may be fabricated on the silicon layer 100 or the glass layer 108 by conventional microfabrication techniques such as chemical etching, mechanical milling, ultrasonic machining, and/or other techniques that are known to those of skill in the art. The chambers 104-1 and 104-2 may be fabricated in a variety of materials in different embodiments, including glass and silicon. For instance, in embodiments where the chambers 104 comprise glass chambers, they may be fabricated by such techniques as glass blowing, fusion bonding, frit bonding, and/or with other techniques known to those of skill in the art. The chambers 104-1 and 104-2 may be affixed with the substrate by anodic bonding, thereby providing a vacuum seal. In operation of the device, cold atoms from a first of the chambers 104-1 are transported to a second of the chambers 104-2 via the microchannel 106.

Figure 1C:
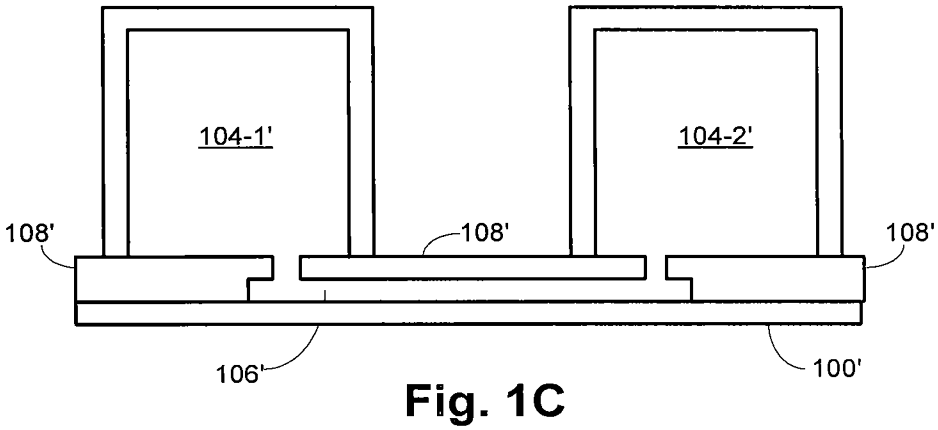
FIG. 1C provides a schematic illustration of an alternative configuration for a microchannel made in accordance with embodiments of the invention.

In an alternative configuration shown in side view in FIG. 1C, the microchannel results from an inverse of the structure shown in FIG. 1A, with each of the corresponding components in FIG. 1C being denoted with primes to emphasize the relationship of those components with the components of FIG. 1A. In this alternative construction, the microchannel 106' results from a groove cut into the glass layer 108' and covered by the silicon layer 100', joining the chambers 104-1' and 104-2'.

Figure 2A:
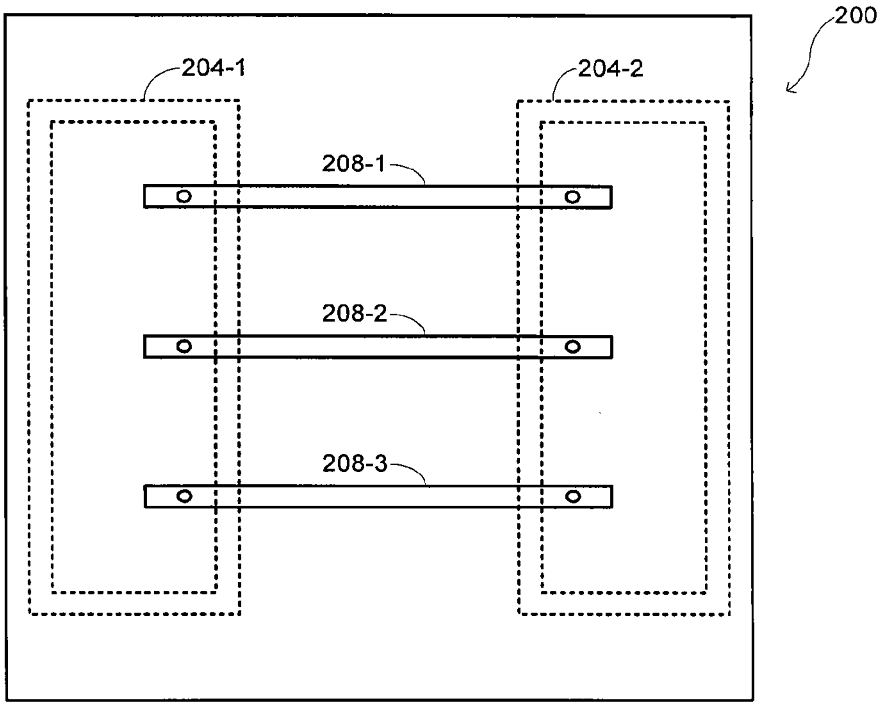
FIGS. 2A and 2B illustrate a similar arrangement in which multiple chambers are interconnected by multiple microchannels.

An illustration of a configuration in which multiple microchannel interconnects are included is illustrated in FIG. 2A. In this embodiment, the device 200 includes two chambers 204 that are each connected with three microchannels 208. The materials used in the fabrication of this embodiment may be similar to those used in the embodiment of FIGS. 1A-1C.

Figure 2B:
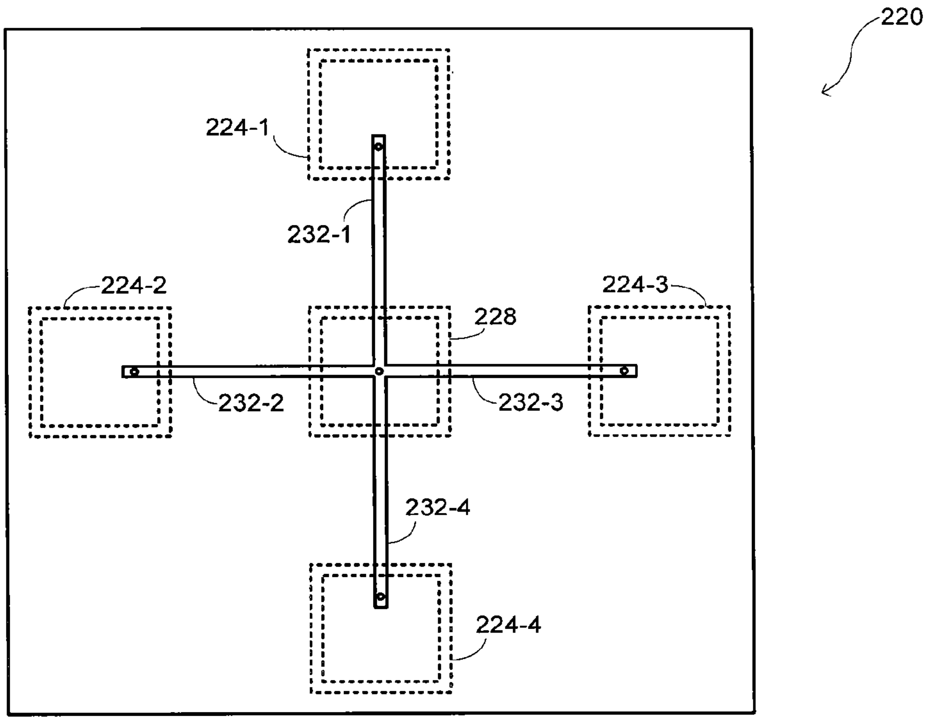

Another configuration in which the number of chambers exceeds two is shown schematically in FIG. 2B. The device 220 in this embodiment includes five chambers in the form of a single central chamber 228 and four perimeter chambers 224. Each of the perimeter chambers 224 is connected with the central chamber 228 with a respective microchannel 232.

It is emphasized that the multichamber and multichannel embodiments shown in FIGS. 2A and 2B are provided only for illustrative purposes and that the invention is not limited to such configurations. More generally, embodiments of the invention include at least two chambers and at least one microchannel, and each chamber may be in direct communication with one or more of the microchannels.

The various structures are used to transport cold atoms between chambers and this transportation may be accomplished in a variety of different ways. Examples of techniques that may be used for the transportation of cold atoms among chambers include the use of light pressure and the use of magnetic fields, among various others.

Figure 3:
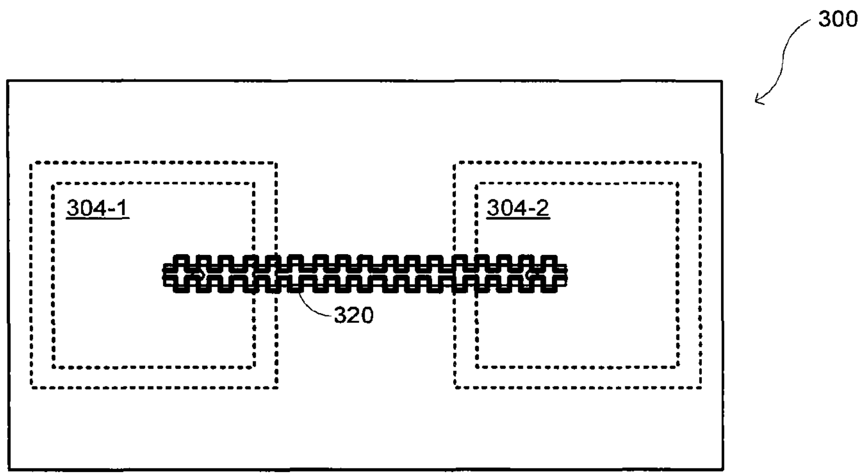
FIG. 3 provides a detailed illustration of microchannel interconnects with active components for atom transport.

FIG. 3 provides an illustration of a configuration in which a mechanism is included for transporting atoms with a movable magnetic trap. A top view is provided that may be compared with the top view of the structure shown in FIG. 1B, with the device identified generically with reference number 300. In this structure, the magnetic trap comprises a magnetic-field minimum such as may be generated using a quadrupole magnetic field, although other multipole configurations may be used in alternative embodiments, as will be understood by those of skill in the art. The transport device 320 may be used to move atoms from one of the plurality of chambers 304-1 to a second of the plurality of chambers 304-2. In one embodiment, it comprises electrically conducting traces that are formed over the substrate of the device, thereby generating the appropriate magnetic field for trapping and movement of cold atoms. Various techniques may be used for forming the electrically conductive traces, such as by patterning an evaporated or sputtered electrically conducting layer deposited over the substrate. It will be appreciated that the particular trace configuration of the transport device 320 shown in FIG. 3 is exemplary and not intending to be limited; there are a variety of different trace configurations that may be used in different embodiments to generate the desired magnetic field.

Figure 4A:
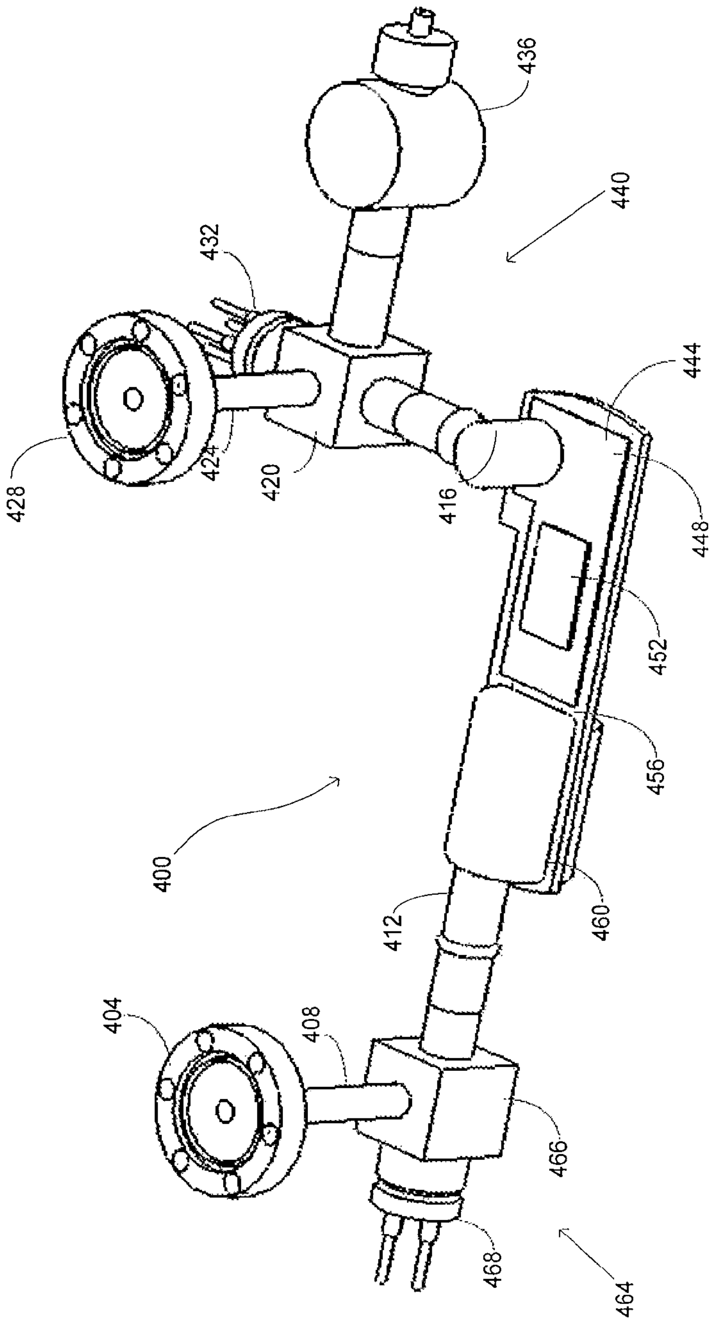
FIG. 4A provides an illustration of a microchannel cold-atom system in one embodiment of the invention.
Figure 4B:
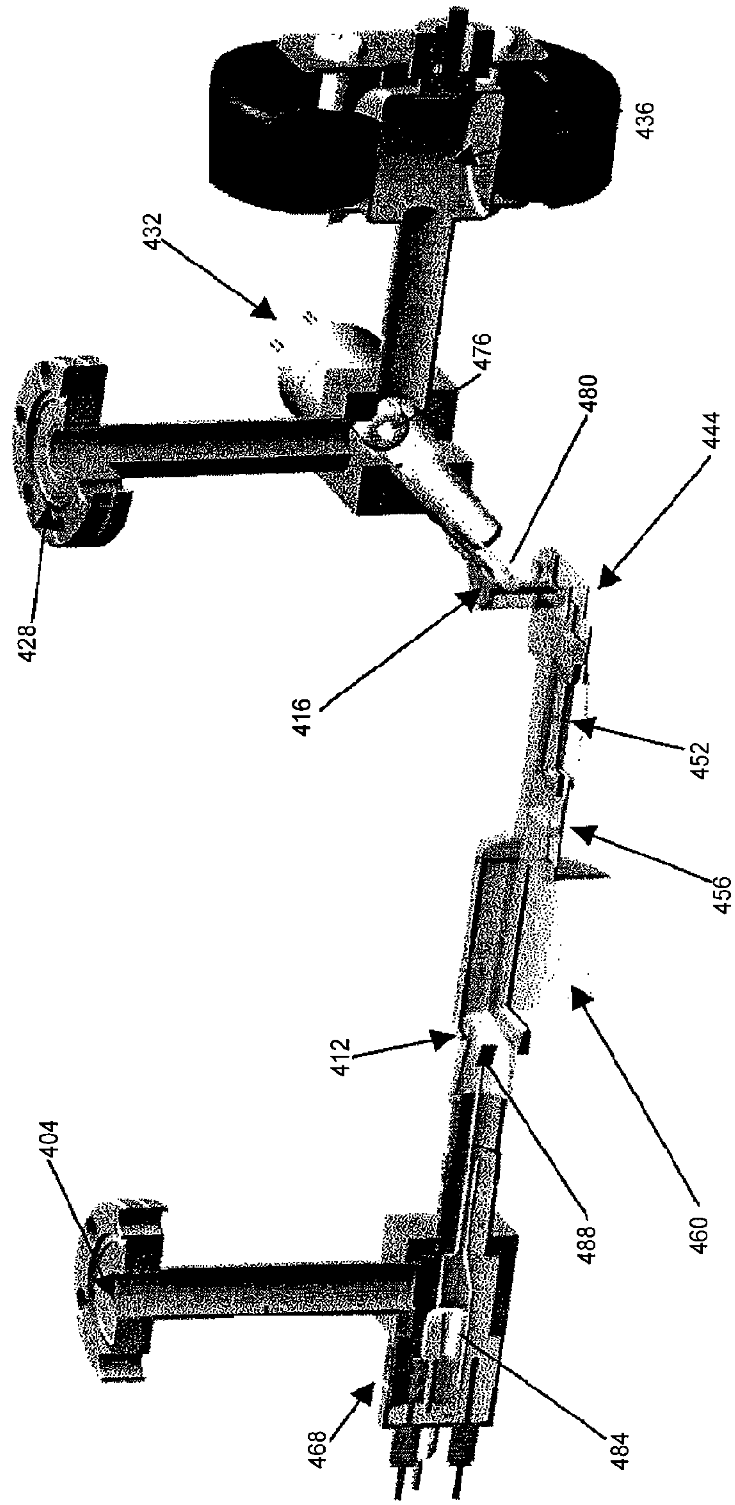
FIG. 4B provides a cross-sectional view of the microchannel cold-atom system of FIG. 4A.

The different kinds of structures shown in FIGS. 1A-3 may be embodied in a variety of different devices that additionally include mechanisms for providing a source of atoms. For example, one illustrative embodiment is shown in FIGS. 4A and 4B, which illustrate a cold-atom system in one configuration; FIG. 4A provides an overview of the structure while FIG. 4B provides a cross-sectional view of the structure. In this embodiment, the system has a microchannel assembly 400, a high-pressure port 464, and a low pressure port 440.

The microchannel assembly 400 comprises a plurality of chambers or cells that may include, depending on the specific characteristics of the embodiment, a high-vacuum chamber or cell 460, one or more buffer cells 456, a faux cell 452, and/or a low-vacuum chamber or cell 444. The chambers or cells are connected by microchannel structures like those described in greater detail above. In addition, the microchannel assembly 400 may comprise manifolds 412 and 416 and an atom chip 448. The components of the microchannel assembly 400 may be fabricated from any of a variety of materials according to the specific embodiment, but in one embodiment comprise glass and silicon that have been assemble together through the use of anodic bonding. As will be known to those of skill in the art, anodic bonding is a technique in which the components to be bonded are placed between metal electrodes at an elevated temperature, with a relatively high dc potential being applied between the electrodes to create an electric field that penetrates the substrates. Dopants in at least one of the components are thereby displaced by application of the electric field, causing a dopant depletion at a surface of the component that renders it highly reactive with the other component to allow the creation of a chemical bond. Alternative assembly techniques that may be used, particularly different kinds of materials are used, include direct bonding techniques, intermediate layer bonding techniques, and other bonding techniques. In other instances, other assembly techniques that use adhesion, including the use of a variety of elastomers, thermoplastic adhesives, or thermosetting adhesives.

The high-pressure port 464 may also be fabricated from a variety of different materials in different embodiments, and in one specific embodiment is fabricated from stainless steel. The high-pressure port 464 comprises a high-pressure-port chamber 466 with electrical feedthroughs 468, a pinch-off tube 408, and a high-pressure pumping port 404.

The low-pressure port 440 has a similar structure and may also be fabricated from a variety of different materials in different embodiments, but is fabricated from stainless steel in one specific embodiment. The low-pressure port 440 comprises a low-pressure-port chamber 420 with electrical feedthroughs 432, a pinch-off tube 424, an ion pump 436, and a low-pressure pumping port 428.

As used herein, references to "high" and "low" pressures in describing ports, chambers, and other components are intended to be relative, with such designations indicating merely that a pressure in a high-pressure component is higher than a pressure in the corresponding low-pressure component. Such designations are not intended to limit the absolute pressure in any particular component to any particular value or range of values. Merely by way of illustration, in one embodiment, the pressure in the high-vacuum chamber or cell 466 is on the order of $10^{-8}$-$10^{-6}$ torr and the pressure in the low-vacuum chamber or cell 444 is on an order less than $10^{-11}$ torr.

The high-pressure port 464 and the low-pressure port 440 are coupled respectively to manifolds 412 and 416. Such coupling may be achieved in a variety of different ways, depending in part on the specific materials used in the structure. For instance, in one embodiment in which the manifolds 412 and 416 comprise glass, the ports 464 and 440 are respectively coupled with the manifolds 412 and 416 by a glass-metal transition.

A gas getter 484 and an alkali-metal dispenser 488 are disposed inside the high-pressure port 464. In one embodiment, the alkali-metal dispenser 488 comprises a rubidium dispenser, but this is not a requirement of the invention and other types of alkali-metal atoms may be dispensed in alternative embodiments. Similarly, a gas getter 476 and an alkali-metal pump or getter 480 are disposed within the low-pressure port 440. These structures and other internal ports are visible in the cross-sectional view of FIG. 4B.

The atom chip 448 may in some embodiments comprise a substrate having electrically conducting traces that provide magnetic fields for cold-atom manipulation and trapping. In one embodiment, the atom chip 448 is fabricated on a silicon substrate, but other substrates may be used in alternative embodiments. The system is typically configured with an adequate interior vacuum. This may be accomplished by fluidic coupling of the pumping ports 404 and 426 with an external vacuum pump system, allowing vacuum processing of the system. Once an adequate vacuum is attained within the atom system, the pinch-off tubes 406 and 424 are closed; closure of the pinch-off tubes may be achieved by crimping pinch-off tubes 406 and 424 made of a metal such as copper, but flame-sealing pinch-off tubes 406 and 424 made of a glass, or by any other technique suitable for the material comprised by the pinch-off tubes 406 and 424.

Figure 4C:
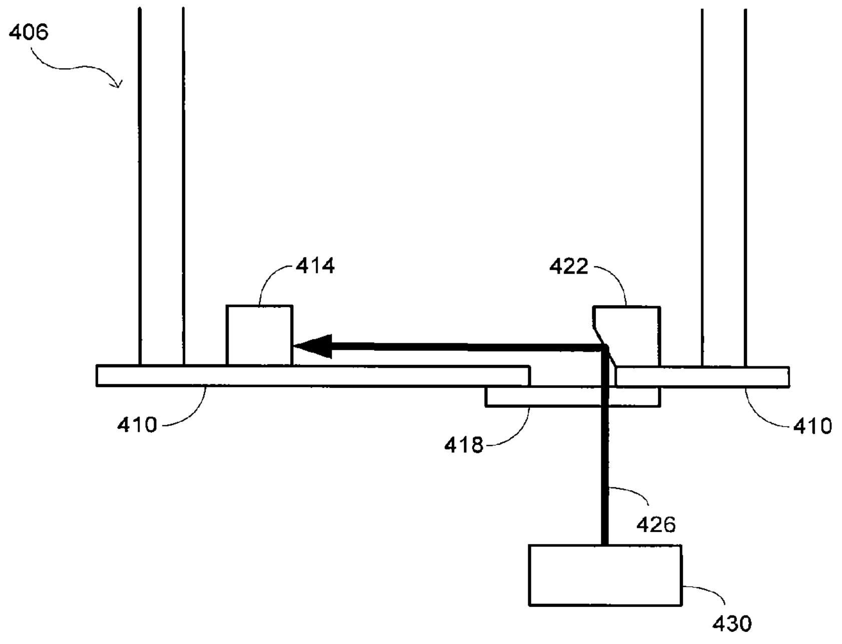
FIG. 4C provides an illustration of an optical device used in embodiments of the invention.

A variety of structures may be included in different embodiments to provide optical access to the chambers. One illustrative example of an optical device that may be included within the low-vacuum chamber is shown schematically in FIG. 4C, although many other configurations are possible in alternative embodiments. In this particular configuration, the optical device 406 comprises a prism 422, a minor 414, an optical window 418, and a fiber/grin lens assembly 430. An incident light beam 426 from the fiber/grin lens assembly 430 is turned 90 degrees by the prism 422 and reflected by the mirror 414 so that a standing light field is formed between the prism 422 and the mirror 414. Such a standing light field may be used as a splitter for cold atoms, thereby providing the functionality of an atom interferometer within the low-vacuum chamber.

In another embodiment, an incident light beam 426 from the fiber/grinn lens assembly 430 is turned approximately 90° by the prism 422 so that it illuminates the volume between the prism 422 and the mirror 414. Conversely, the embodiment of FIG. 4C can be used to collect light and/or to image the volume inside the chamber between the prism 422 and the mirror 414. One application is for performing absorption and fluorescence spectroscopy of atoms inside the chamber. In another particular embodiment, the fiber/grin lens assembly 430 can be replaced by a laser and/or photodetector to illuminate and/or detect light. A multitude of these devices, shown in FIG. 4C, can be arranged at a single location in a particular chamber to provide simultaneous illumination and light collection. In a particular embodiment, these devices can be arranged to have their optical axes substantially orthogonal to each other.

Figure 4D:
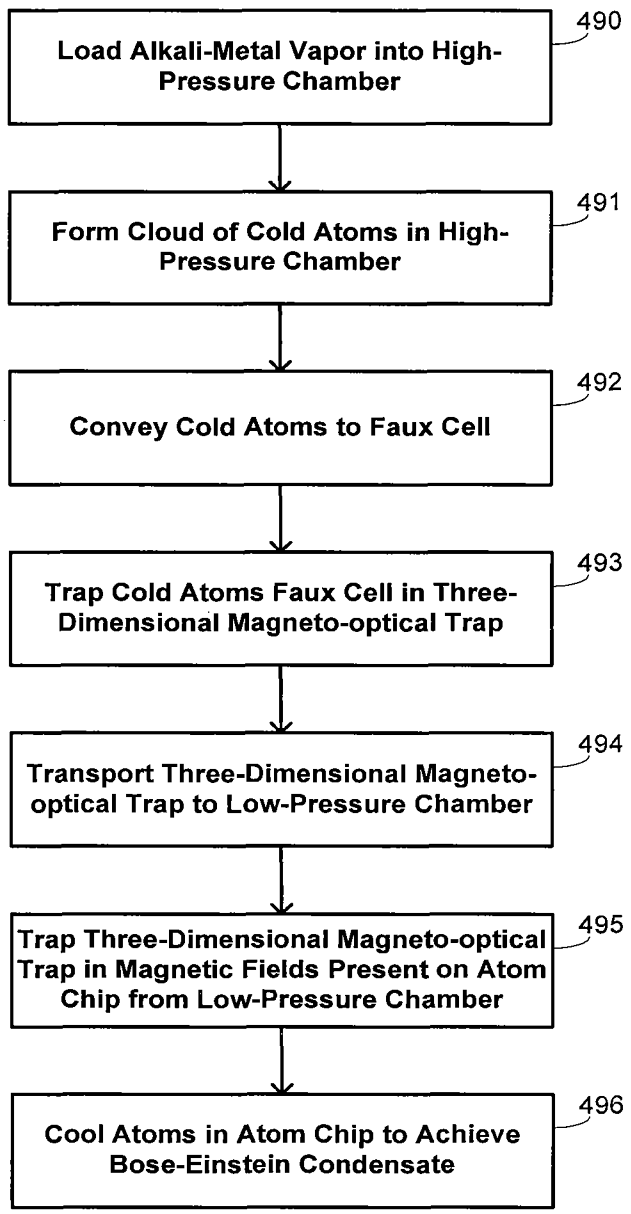
FIG. 4D is a flow diagram summarizing methods of using the microchannel cold-atom system of FIGS. 4A and 4B.

FIG. 4D is a flow diagram that summarizes one mode of operation of the cold-atom system of FIGS. 4A and 4B. It is noted that while specific steps are indicated in this flow diagram in a particular order, that variations may be made without departing from the intended scope of the invention. For example, the order of the steps in the drawing is not intended to be limiting and in some alternative embodiments, the steps might be performed in a different order. Also, the specific identification of steps in FIG. 4D is not intended to be limiting; in alternative embodiments, some of the steps might be omitted and/or additional steps not specifically identified in the drawing might also be included. Furthermore, while FIG. 4D is discussed in connection with the cold-atom system of FIGS. 4A and 4B, it is noted that the method may be practiced with other system structures.

At block 490 of FIG. 4D, alkali-metal vapor is loading into the high-vacuum chamber 460 from the dispenser 488. A cloud of cold atoms is formed in the high-vacuum chamber 460 at block 491, which may be accomplished using conventional cold-atom techniques know to those of skill in the art, such as by using a magneto-optical trap. The cold atoms are conveyed at block 492 from the high-vacuum chamber 460 to the faux cell 452. This may be accomplished by conveying the cloud of cold atoms along microchannels and across buffer cells 456. The buffer cells 456 are used for differential vacuum pumping, as well as for providing thermal and optical isolation. In addition, the buffer cells 456 are used to trap or getter free alkali-metal atoms that are not trapped in the two-dimensional optical trap.

Once the cold atoms reach the faux cell 452, the cloud is trapped in a three-dimensional magneto-optical trap at block 493, using conventional cold-atom techniques. This three-dimensional magneto-optical trap is transported to the low-vacuum chamber 444, at block 494 using a movable magnetic field. One embodiment for this magnetic transfer mechanism has been described in detail above. Once the atoms reach the low-vacuum chamber 444, they are trapped in magnetic field present on the atom chip 448, as indicated at block 495. Conventional cooling techniques known to those of skill in the art are applied at block 496 to condense the atoms within the atom chip 448 and thereby form a Bose-Einstein condensate.

Figure 5:
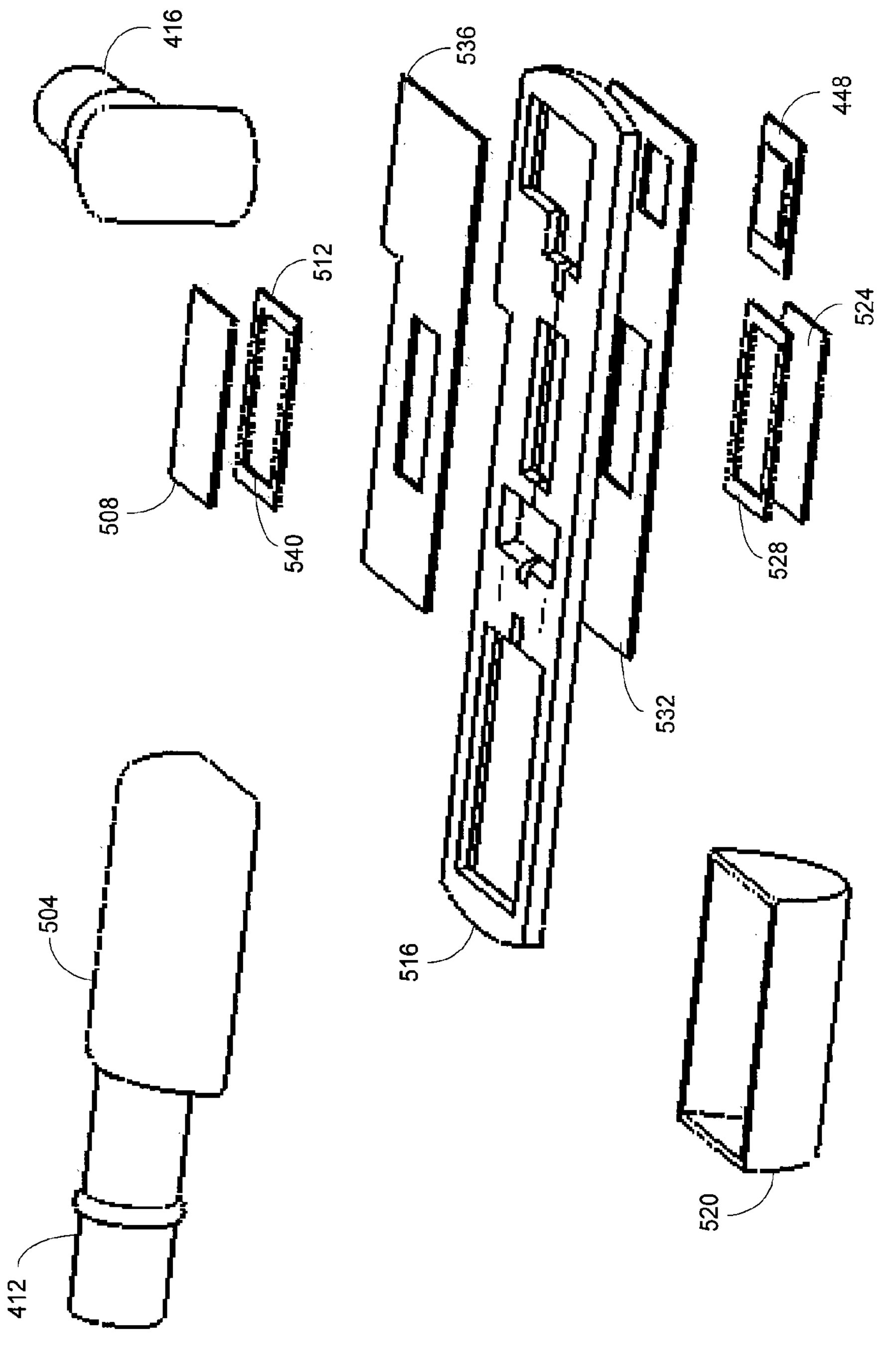
FIG. 5 provides an exploded view of a vacuum-cell subsystem used with the microchannel cold-atom system of FIG. 4A.

FIG. 5 provides an exploded view of the microchannel vacuum cell subsystem 400 and illustrates that it comprises a number of different components, which in some embodiments are made of glass and silicon. The subsystem 400 may be considered to be organized about the substrate 516 since it forms a frame where additional glass and silicon components may be attached. Other components in the subsystem 400 include cover plates 532 and 536, which may be formed of glass in some embodiments; frames 512 and 540, which may be formed of silicon in some embodiments; a faux-cell cover plate 508, which may be formed of glass in some embodiments; half-cylinder cells 504 and 520, which may be formed of glass in some embodiments; manifolds 412 and 416, which may be formed of glass in some embodiments; and the atom chip 448. In some embodiments, the substrate 516 is fabricated from silicon that is typically about 2 mm thick.

The substrate 516 may be fabricated by chemical etching, mechanical milling, ultrasonic machining, or by any other suitable technique. The other planar components of the subsystem 400 may be fabricated using similar fabrication techniques. Chemical etching of may be accomplished by various methods, examples of which are to use a KOH solution to etch silicon and to use an HF solution to etch glass. Mechanical milling may be accomplished using various devices, suitable examples of which include computer numerical control ("CNC") milling machines. Glass cells, such as half-cylinder cells 504 and 520, may be manufactured using glass-fabrication techniques, such as by using glass tubing in combination with glass blowing of end covers. Similarly, the manifold 412 may be attached with the cell 504 using glass-blowing techniques. Glass and silicon components may be assembled using anodic bonding as discussed above, or by using an alternative bonding technique such as described above.

Figure 6A:
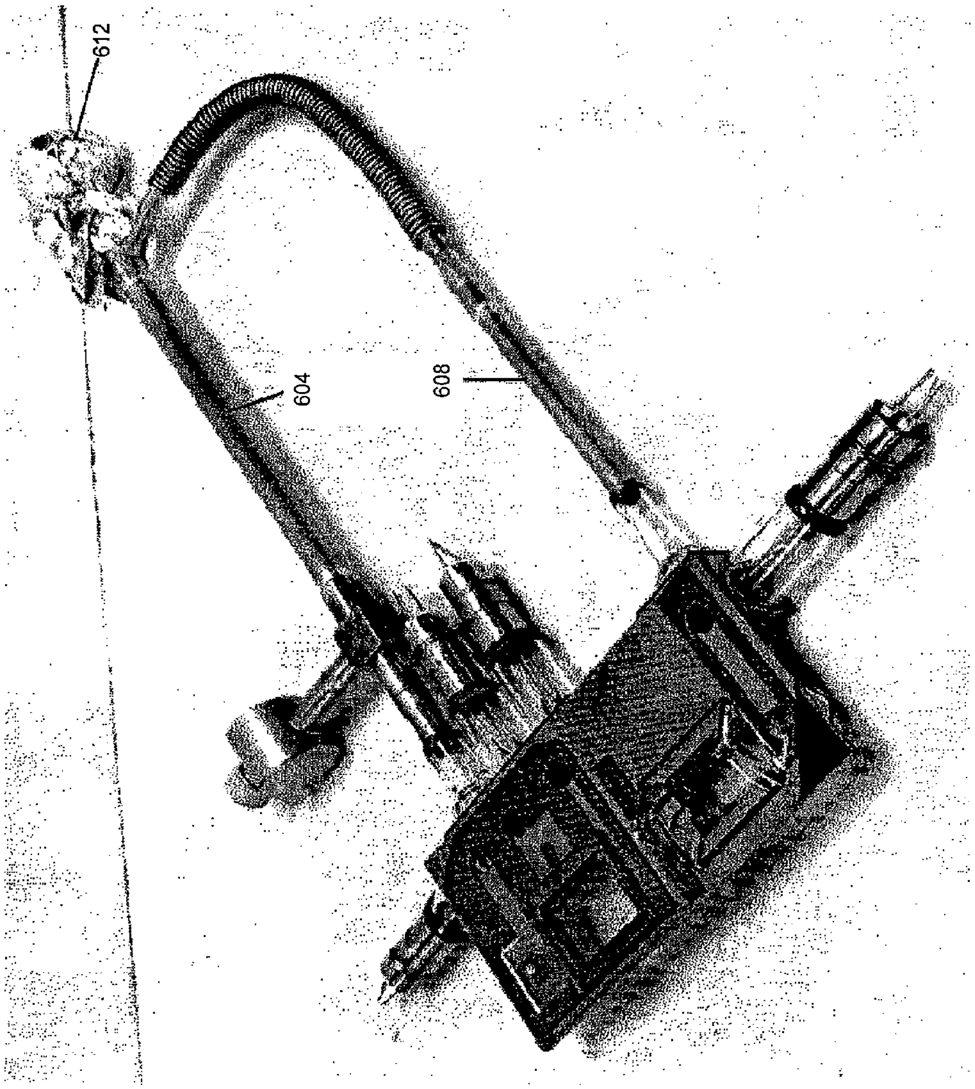
FIGS. 6A and 6B provide images of a microchannel cold-atom system in another embodiment of the invention.
Figure 6B:
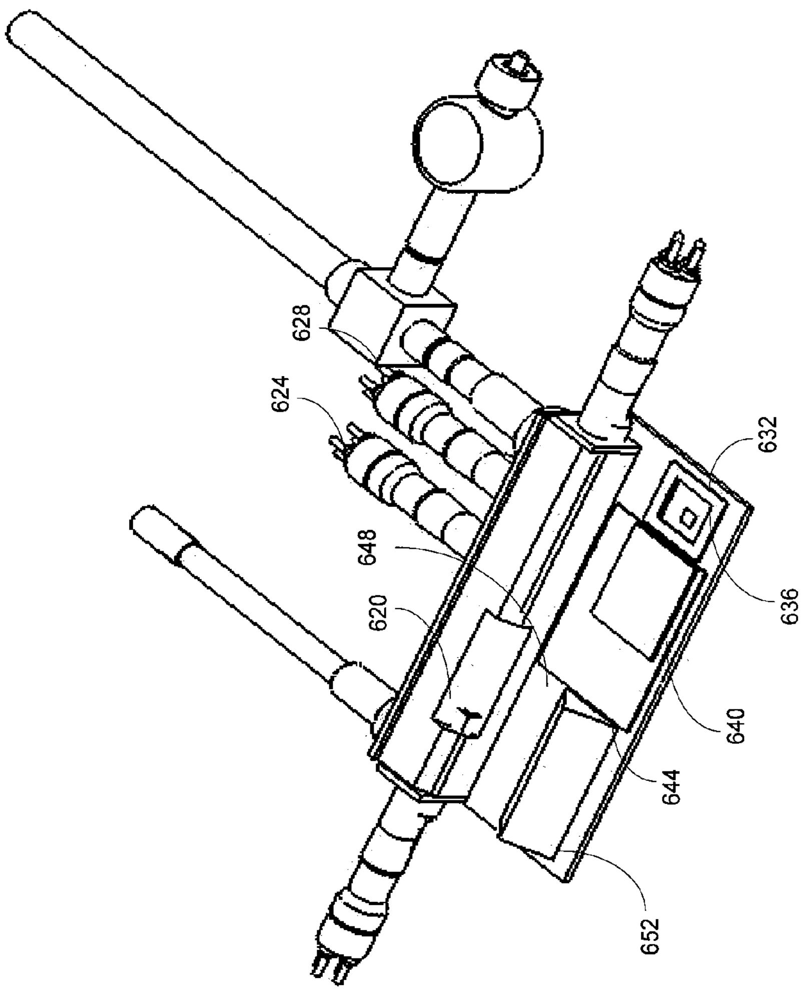

Another embodiment of a cold-atom system made in accordance with embodiments of the invention is shown in FIGS. 6A and 6B. In this example, the microchannel assembly has the same functional architecture as in the example of FIGS. 4A and 4B. The microchannel assembly 644 includes the same basic components, specifically a high-vacuum chamber 652 and a low-vacuum chamber 632, with buffer cells 648, a faux cell 640, and an atom chip 640. One additional feature in the embodiment of FIGS. 6A and 6B is the inclusion of ports 604 and 608 for the buffer cell and faux cell respectively. These ports 604 and 608 may house alkali-metal pumps and/or getters. In addition, in some embodiments, all the ports may be attached with a single manifold 620 to provide added mechanical robustness and simplified construction. In the specific implementation of FIGS. 6A and 6B, the pinch-off tubes have been connected together to have a single pumping port 612 for external vacuum pumping and processing.

The alkali-metal pump or getter may comprise an electrical feedthrough, a housing, a gold evaporator, and a receptor foil. Additional details of alkali-metal pumps are provided in U.S. patent application Ser. No. 12/121,068, entitled "Alkaline Metal Dispensers and Uses for Same," filed May 15, 2008, the entire disclosure of which is incorporated herein by reference for all purposes. In one embodiment, the gold evaporator comprises a tungsten wire with gold wrapped around the wire. Gold is then evaporated by passing a current through the tungsten wire and heating the gold. The receptor may comprise a nickel-chrome foil that becomes coated with gold when evaporated. As is known to those of skill in the art, gold and alkali metals may thus be used to form an alloy, thereby providing a pumping or getter function.

Figure 6C:
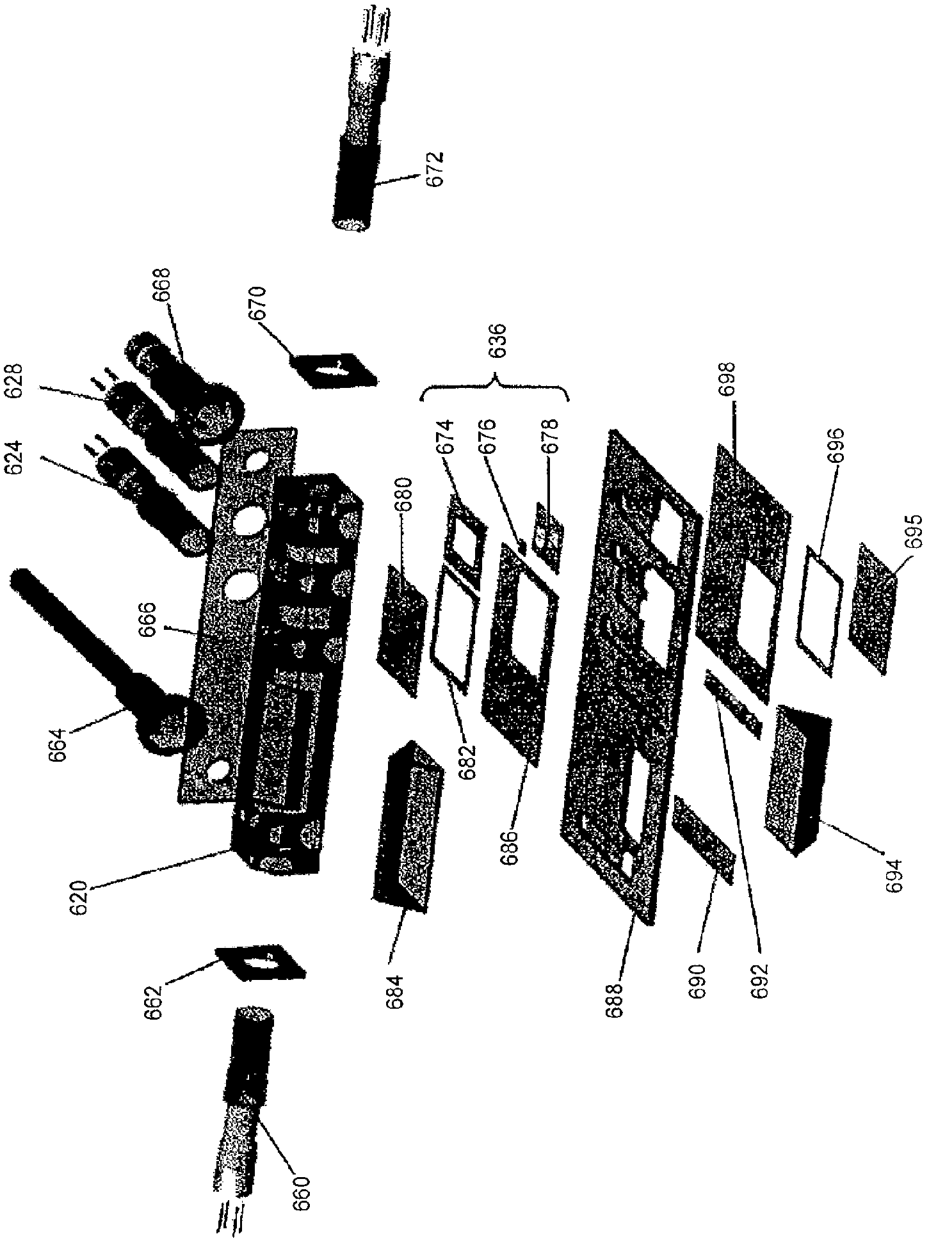
FIG. 6C provides an exploded view of an alkali-metal pump or getter used with the microchannel cold-atom system of FIGS. 6A and/or 6B.

A detailed illustration of the structure is shown with the exploded view of FIG. 6C. The system may be considered to be organized structurally about the substrate 688, which may be viewed as a frame where additional components are attached. Such components include cover plates 686, 698, 690, and 692, which may in some embodiments comprise glass cover plates; frames 682, 696, 670, 662, and 666, which may in some embodiments comprise silicon frames; faux cell cover plates 680 and 695, which may in some embodiments comprise a glass cover plate; generally triangular cells 684 and 694, which may in some embodiments comprise glass cells; a dispenser port 660; an alkali-metal pump and gas getter port 672; pump ports 668 and 664; alkali-metal pumps 624 and 628; and the atom chip 636. The atom chip 636, in turn, may comprise a substrate such as a silicon substrate with metal traces 678; an optical window 676; and a frame 674, which may in some embodiments comprise a glass frame.

The substrate 688 may be fabricated of silicon that is typically 2 mm thick and may be fabricated from a variety of techniques that include chemical etching, mechanical milling, and/or ultrasonic machining. The other planar components may be fabricated using similar fabrication methods, but this is not a requirement of the invention. For instance, chemical etching of silicon may be accomplished by using a KOH solution and chemical etching of glass may be accomplished by using HF solution. Mechanical milling may be performed by using a CNC machine as described above. When cells 684 and 694 are made of glass, they may be made from square glass cells in combination with glass blowing of end covers. Glass and silicon components may be assembled using anodic bonding as discussed above, or by using an alternative bonding technique such as described above.

There are a variety of structures that may be used in different embodiments to provide the electrical feedthroughs. In some embodiments, commercially available feedthroughs may be used, but in other embodiments, a feedthrough such as illustrated schematically in FIGS. 7A-7C may be used. FIG. 7A provides a top view and FIG. 7B provides a side view. The embodiment shown in those drawings comprises a substrate 700 that includes through holes and cover plates 704. The substrate 700 comprises glass in particular embodiments, such as in an embodiment where it comprises Pyrex glass, and the cover plates 704 comprises a nickel alloy in some embodiments. In other embodiments, the cover plates 704 comprise a semiconductor such as silicon. In a specific embodiment, the cover plates comprise nickel alloy 42 polished to a mirror finish. In embodiments where the cover plates 704 comprise a nickel alloy or a semiconductor, and the substrate comprises glass, they my be bonded together using anodic bonding techniques.

As shown in FIG. 7C, the planar electrical feedthrough may be bonded to a silicon planar substrate that is part of an ultrahigh-vacuum ("UHV") chamber or cell 720 as well as to one of the microchannel systems described above. These planar electrical feedthroughs are available to provide electrical power to components such as alkali-metal dispensers 724 inside the UHV chamber or cell. Other components that may be powered with the use of such electrical feedthroughs include gas getters, alkali-metal getters, gold evaporators, nichrome ribbons, magnetic trap elements, and the like.

Figure 8C:
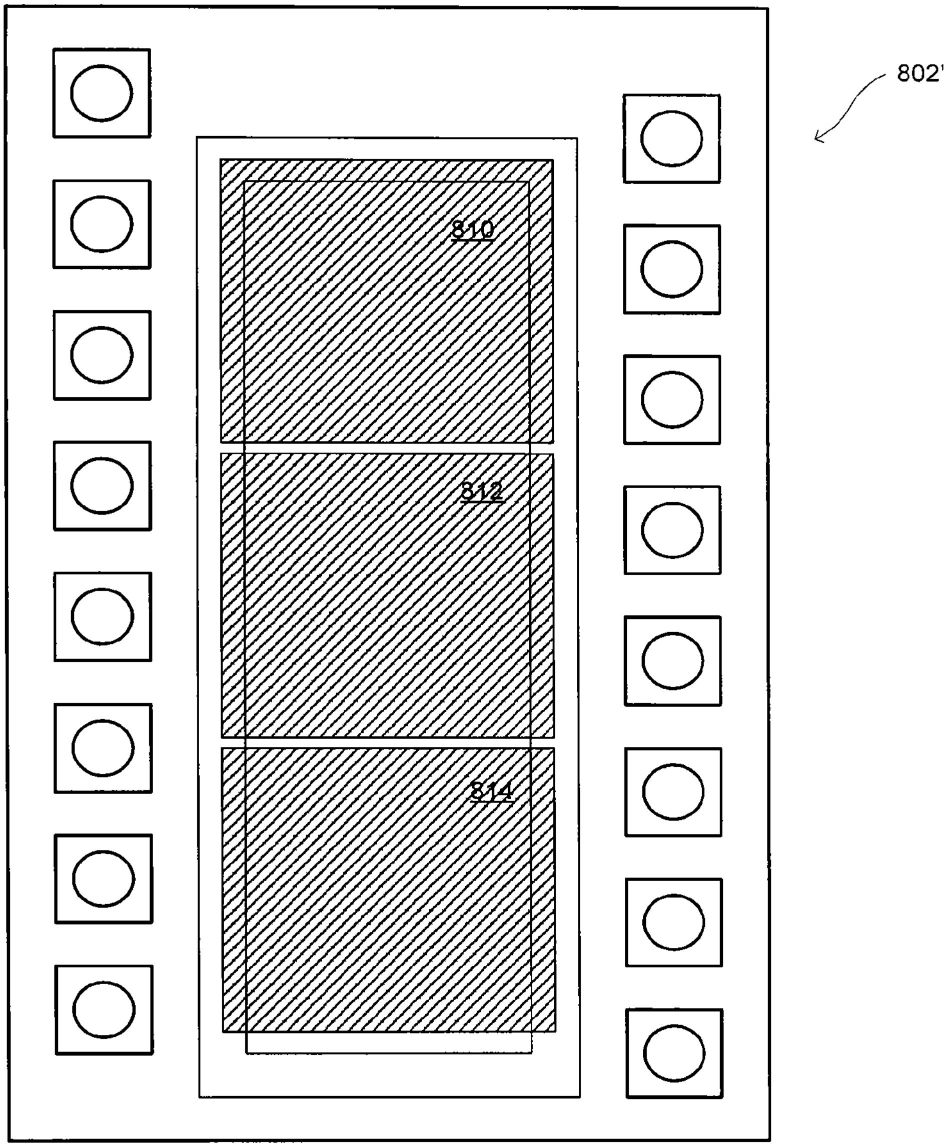
FIG. 8C provides an illustration of a planar atom manipulator device with multiple regions.

FIGS. 8A-8C provide illustrations of UHV electrical interconnect systems for a planar processor device, one example of which is the atom chip described above. Additional details of the structure of an atom chip or planar atom processor device are provided in one example in U.S. Pat. No. 7,126,112, the entire disclosure of which is incorporated herein by reference for all purposes. The basic structure in one embodiment is illustrated in FIGS. 8A and 8B, in which the planar atom processor device comprises a substrate with metal traces that produce magnetic fields for atom guiding and trapping. FIG. 8A provides a top view and FIG. 8B provides a side view. The substrate may conveniently comprise silicon or aluminum nitride, among other materials.

The atom processor comprises a support frame 802, electrical feedthroughs 804, wire interconnects 806, and a substrate 808. The support frame 802 may be made of glass in some embodiments and attached with the substrate 808 using anodic bonding. In embodiments where the substrate 808 comprises aluminum nitride, a mediator layer of polycrystalline silicon may be deposited on the substrate before anodic bonding. Metal traces may be formed on the surface of the substrate 808 by conventional lithographic techniques to provide magnetic fields for atom guiding and trapping. The electrical feedthroughs may be fabricated using the same methods described above. The electrical interconnects 806 between the metal traces on the substrate 808 and the electrical feedthroughs 804 may be made by wire bonding.

In another embodiment illustrated in FIG. 8C, the substrate 808 may have multiple regions such as a coupling region 810, a trapping region 812, and a splitting region 814 for atom processing. In the coupling region 810, a cloud of cold atoms is coupled from free space to atom waveguides on the substrate 808. In the trapping region 812, atoms are trapped and further cooled. In the splitting region 814, the atom cloud is split and recombined to form as an example of an atom interferometer. In one embodiment, the atom cloud splitting is accomplished by a standing light field generated by a set of prisms, as described in connection with FIG. 4C.

Figure 9A:
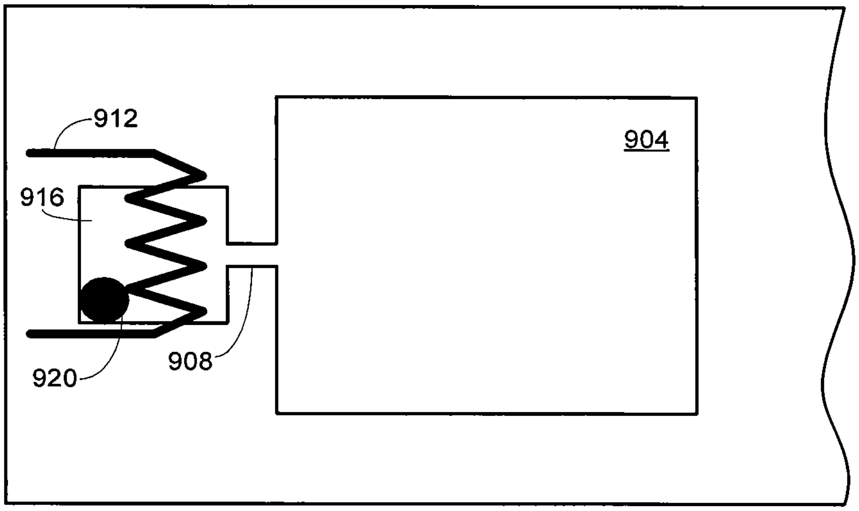
FIG. 9A provides an illustration of an alkali-metal dispenser that may be used with the microchannel cold-atom systems of the invention.

In some of the microchannel cold-atom systems described herein, the alkali-metal source is based on a thermal decomposition of a chemical compound, one example of which is rubidium carbonate, which may be used in the production of rubidium atoms. Additional details of alkali-metal sources are provided in U.S. Pat. Publ. No. 2006/0257296 and in U.S. patent application Ser. No. 12/121,068, both of which are incorporated herein by reference for all purposes. The thermal decomposition generally produces gas byproducts that are detrimental to the atom-cooling process. The alkali metal is dispensed to a first chamber or cell. In this embodiment, which is illustrated in FIG. 9A, an alkali-metal dispenser is implemented where the source comprises a pure alkali metal such as $^{87}$Rb. A reservoir 916 is connected to the chamber 904 by an aperture 908. the reservoir 916 comprises a heater 912 and is filled with pure alkali metal 920. The release of alkali metal to the chamber 904 is controlled by the size of the aperture 908 and modulation of the alkali vapor pressure with temperature. The alkali metal may be loaded into the cell 916 by syringe or pin transfer from a pure alkali-metal vial before the cell 916 is sealed by anodic bonding.

Figure 9B:
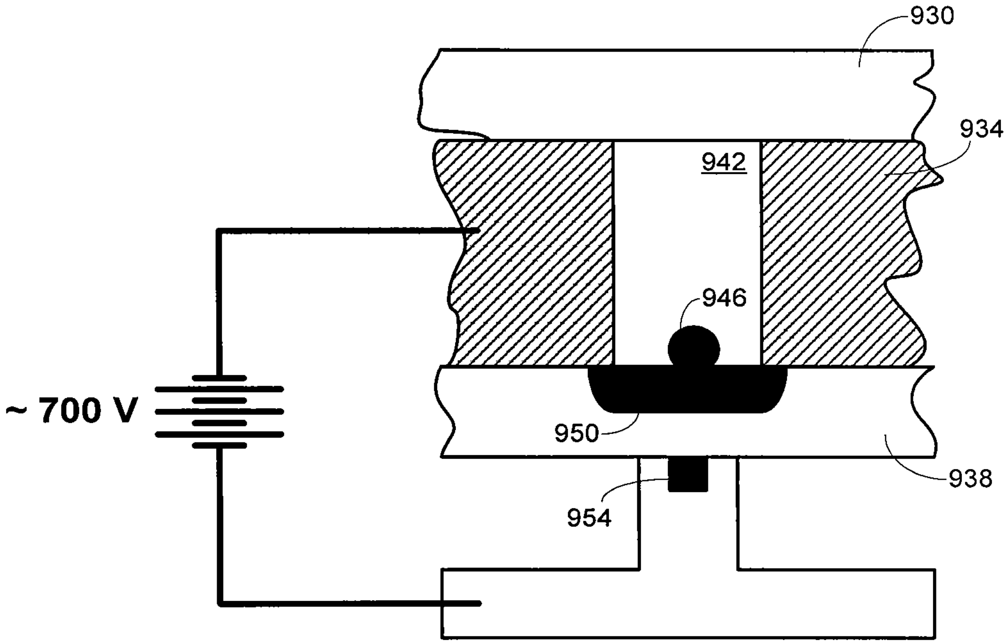
FIG. 9B provides an illustration of filling a cell with pure alkali metal in accordance with embodiments of the invention.

In another embodiment, the reservoir is filled by electrolytic transport of alkali metal through a glass wall, as illustrated in FIG. 9B (see F. Gong et al., Rev. Sci. Instrum. 77, 076101 (2006)). In this embodiment, an alkali-metal-enriched glass 950 is prepared and applied to a wall of the reservoir 942. The glass may, for example, be prepared as $^{87}$Rb carbonate+boron oxide at a temperature of about 900° C. for about 30 minutes. Electrolytic transport is accomplished by applying a voltage, which may be about 700 V in one embodiment, between a silicon layer 934 and molten $NaNO_3$ salt electrode 954 at about 540° C. The alkali metal 946 is released from enriched glass 950 into the reservoir 942.

Features of note with the various embodiments described herein include differential vacuum pumping between the high-pressure and low-vacuum chambers, as well as light isolation, thermal isolation, and magnetic isolation between the chambers. The various structures provided a platform for integration of optics and laser sources directly on the device.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A cold-atom system comprising:

a substantially flat surface forming a frame on which a plurality of vacuum chambers are created, a first of the vacuum chambers including an atom source; and a fluidic connection between the first of the vacuum chambers and a second of the vacuum chambers, the fluidic connection comprising a microchannel formed as a groove in the substantially flat surface and covered by a layer of material to form a seal to allow atoms to flow from the first of the vacuum chambers to the second of the vacuum chambers.

2. The cold-atom system recited in claim 1 wherein the second of the vacuum chambers includes an atom chip.

3. The cold-atom system recited in claim 1 wherein the microchannel is formed within a single substrate.

4. The cold-atom system recited in claim 1 wherein at least one of the vacuum chambers includes a gas getter.

5. The cold-atom system recited in claim 1 wherein at least one of the vacuum chambers includes an atom getter.

6. The cold-atom system recited in claim 1 wherein at least one of the vacuum chambers includes an ion pump.

7. The cold-atom system recited in claim 1 wherein at least one of the vacuum chambers includes a magnetic trap.

8. The cold-atom system recited in claim 1 wherein at least one of the vacuum chambers includes an optical trap.

9. The cold-atom system recited in claim 1 further comprising a mechanism to transport an atom through the microchannel from the first of the vacuum chambers to the second of the vacuum chambers.

10. The cold-atom system recited in claim 9 wherein the mechanism comprises a magnetic motor.

11. The cold-atom system recited in claim 1 wherein at least one of the vacuum chambers comprises a source of illumination.

12. The cold-atom system recited in claim 11 wherein the source of illumination comprises on optical arrangement configured to generate a standing light field from the source of illumination.

13. The cold-atom system recited in claim 1 wherein at least one of the vacuum chambers includes at least one detector.

14. The cold-atom system recited in claim 1 wherein at least one of the vacuum chambers includes a source of illumination and a detector.

15. The cold-atom system recited in claim 1 wherein at least one of the vacuum chambers includes an optical arrangement.

16. The cold-atom system recited in claim 15 wherein the optical arrangement comprises an atom optical trap.

17. The cold-atom system recited in claim 1 wherein the microchannel structure is micromachined.

18. The cold-atom system recited in claim 1 wherein at least one of the vacuum chambers is in fluid communication with a vacuum port through an interface.

19. The cold-atom system recited in claim 18 wherein the interface comprises a manifold.

20. The cold-atom system recited in claim 19 wherein the manifold is in fluid communication with multiple of the plurality of chambers.

21. The cold-atom system recited in claim 19 wherein the manifold comprises an atom dispenser.

22. The cold-atom system recited in claim 19 wherein the manifold comprises a gas getter.

23. The cold-atom system recited in claim 19 wherein the manifold comprises an atom getter.

24. The cold-atom system recited in claim 19 wherein the manifold comprises an ion pump.

25. The cold-atom system recited in claim 18 wherein the vacuum port is sealed after vacuum processing.

26. The cold-atom system recited in claim 1 wherein the atom source comprises:

a reservoir fluidicly coupled with the first of the vacuum chambers through an aperture and including an alkali metal; and a heater disposed to heat the reservoir.

27. The cold-atom system recited in claim 26 wherein the atom source comprises a pure alkali metal.

28. The cold-atom system recited in claim 26 wherein heater comprises a resistive heater.

29. The cold-atom system recited in claim 26 wherein the reservoir comprises alkali metal provided by electrolytic transport of alkali metal through a glass wall.

30. A method of handling cold atoms, the method comprising:

producing a cold atom from an atom source disposed within a first vacuum chamber; and transporting the cold atom from the first vacuum chamber to a second vacuum chamber through a microchannel formed as a groove in a substantially flat surface and covered by a layer of material, wherein the substantially flat surface forms a frame on which the first vacuum chamber and the second vacuum chamber are created.

31. The method recited in claim 30 wherein the second vacuum chamber includes an atom chip.

32. The method recited in claim 30 wherein the microchannel is formed within a single substrate.

33. The method recited in claim 30 wherein at least one of the vacuum chambers includes a gas getter.

34. The method recited in claim 30 wherein at least one of the chambers includes an atom getter.

35. The method recited in claim 30 wherein at least one of the vacuum chambers includes an ion pump.

36. The method recited in claim 30 wherein transporting the cold atom from the first vacuum chamber to the second vacuum chamber comprises transporting the cold atom with a magnetic motor.

37. The method recited in claim 30 further comprising illuminating at least one of the vacuum chambers.

38. The method recited in claim 37 wherein illuminating at least one of the vacuum chambers comprises generating a standing light field within the at least one of the vacuum chambers from a source of illumination.

39. The method recited in claim 30 further comprising detecting at least one of the vacuum chambers.

40. A cold-atom system comprising:

a frame having a microchannel formed therein to create a fluidic connection between regions on the frame; and a plurality of components bonded with the frame with a vacuum-compatible bond and compatible with a temperature change greater than 100 K to form at least a first vacuum chamber having an atom source.

41. The cold-atom system recited in claim 40 wherein the frame comprises silicon and at least some of the plurality of components comprise glass.

42. The cold-atom system recited in claim 41 wherein the frame has a thickness of at least 2 mm.

43. The cold-atom system recited in claim 40 where at least some of the plurality of components are anodically bonded with the frame.

44. The cold-atom system recited in claim 40 wherein the frame comprises a substantially flat substrate having a plurality of embedded cavities.

45. A cold-atom system comprising:

a plurality of vacuum chambers, at first of the vacuum chambers including an atom source and a second of the vacuum chambers including an optical-quality window;

a source of illumination; and an optical train mounted onto a substrate in the cold atom system and disposed to propagate light from the source of illumination through the optical-quality window to illuminate the second of the vacuum chambers.

46. The cold-atom system recited in claim 45 wherein the second of the vacuum chambers comprises the first of the vacuum chambers.

47. The cold-atom system recited in claim 45 wherein the optical train is configured to generate a standing light field from the light within the second of the vacuum chambers.

48. The cold-atom system recited in claim 45 wherein the optical train comprises a laser and a lens.

49. The cold-atom system recited in claim 45 wherein the optical train comprises a fiber optic and a lens.

50. An electrical feedthrough comprising:

a substrate having a throughhole; and an element bonded to the substrate with a vacuum-compatible bond, the element including an electrically conducting cover plate.

51. The electrical feedthrough recited in claim 50 wherein the cover plate is bonded to the substrate.

52. The electrical feedthrough recited in claim 50 wherein the vacuum-compatible bond comprises an anodic bond.

53. The electrical feedthrough recited in claim 50 wherein the vacuum-compatible bond is additionally compatible with a temperature change greater than 100 K.

54. The electrical feedthrough recited in claim 50 wherein the substrate comprises glass.

55. The electrical feedthrough recited in claim 50 wherein the cover plate comprises a nickel alloy.

56. The electrical feedthrough recited in claim 50 wherein the cover plate comprises a semiconductor.

57. The electrical feedthrough recited in claim 50 wherein the cover plate comprises a metal or metal alloy polished to a mirror finish.

58. The electrical feedthrough recited in claim 50 wherein the electrical feedthrough is bonded with a substantially planar substrate that is part of an ultrahigh vacuum chamber.

* * * * *

UNITED STATES PATENT AND TRADEMARK OFFICE

CERTIFICATE OF CORRECTION

PATENT NO. : 8,415,612 B2
APPLICATION NO. : 12/600825
DATED : April 9, 2013
INVENTOR(S) : McBride et al.

It is certified that error appears in the above-identified patent and that said Letters Patent is hereby corrected as shown below:

In the Specification

Column 7, line 28, delete “minor” and insert --mirror--

Signed and Sealed this
First Day of October, 2013

Teresa Stanek Rea
*Deputy Director of the United States Patent and Trademark Office*